United States Patent [19]
Pedersen

[11] 3,823,950
[45] July 16, 1974

[54] IMPROVED PRESSURE VENTED WEAR RING ASSEMBLY FOR USE IN ROTARY MACHINERY

[75] Inventor: Haakon O. Pedersen, Yardly, Pa.
[73] Assignee: DeLaval Turbine, Inc., Trenton, N.J.
[22] Filed: Oct. 24, 1972
[21] Appl. No.: 299,852

[52] U.S. Cl. ................................. 277/70, 277/53
[51] Int. Cl. ............................................ F16j 15/40
[58] Field of Search ............ 277/70, 71, 53, 79, 29; 415/113, 171, 172

[56] References Cited
UNITED STATES PATENTS
| | | | |
|---|---|---|---|
| 2,851,289 | 9/1958 | Pedersen | 277/70 |
| 2,865,300 | 12/1958 | Garris | 277/71 X |
| 3,411,794 | 11/1968 | Allen | 277/53 |

Primary Examiner—Samuel B. Rothberg
Attorney, Agent, or Firm—Sandoe, Hopgood & Calimafde

[57] ABSTRACT

An improved, pressure vented, wear ring assembly is herein described for use in rotary machinery having a substantial axial pressure gradient. A rotor shaft contacting element, in the form of a plastic wear ring, is mounted in a holding member to extend generally coaxially about the axis of rotation of the rotor member. The holding member substantially encloses all but the rotor engaging portion of the wear ring and is formed with pressure relieving apertures, or exhaust ports, to release high pressure fluid, trapped between opposing surfaces of the wear ring and the holder, to a low pressure region. An intermediate ring or liner is interposed between the wear ring and the holder member, which intermediate ring comprises a porous, non-extrudable member having a relatively high compressive strength. The porous member is operable to direct the trapped high pressure fluid axially, radially and circumferentially of the wear ring, to the exhaust ports formed in the holder, while maintaining the wear ring in a properly aligned, operational posture.

16 Claims, 4 Drawing Figures 3,823,950

IMPROVED PRESSURE VENTED WEAR RING ASSEMBLY FOR USE IN ROTARY MACHINERY

BACKGROUND OF THE INVENTION

The present invention relates to fluid seal assemblies and, more specifically pertains to vented seals, and the like, for rotary machinery.

Typically, pressure seals are mounted in centrifugal pumps, turbines, and the like, along the axial length of a rotor shaft, for the purpose of isolating high pressure and low pressure regions on either axial side of the seal. Such a seal may include radially extending serrations formed on the rotor shaft and a stationary wear ring mounted in a holder and operating with a small to zero clearance with respect to the peripheries of the rotor serrations.

As the operational pressures and temperatures, handled by rotary machinery, increased during the 1950's, problems were developing with respect to the use of plastic wear rings. The typical wear ring assembly, at that time, included an annular holding member, which was generally channel shaped in cross section and mounted within the housing of the machinery to hold the wear ring in a proper operational posture. Although the space defined between the holder and the wear ring was kept to a minimum tolerance, the axial pressure differential across the seal tended to force high pressure fluid into the space which fluid then became trapped therein. The fluid, in turn, forced the wear ring radially inwardly toward the serrations. Accordingly, when the wear ring consisted of a plastic material, excessive wear on the ring and the plastic flow or extrusion thereof into the grooves, defined by the serrations, made the use of plastic rings impractical above certain operating pressures and temperatures.

Additionally, due to the combined effects of high pressure being asserted axially on the wear ring, toward a low pressure region, and the trapped high pressure fluid urging downwardly, adjacent the low pressure side of the wear ring, there was a tipping tendency which produced extreme wear and plastic deformation toward the low pressure side of the ring. Hence, the use of plastic wear rings in a high temperature and pressure environment had, at one time, become very impractical.

Contrasting with the impracticality of using plastic wear rings was the particular desirability for using such rings in rotary machinery, in that plastic rings will not seize as readily as metallic rings and are not as affected by metallic impurities, in an associated fluid, as are metallic rings. When corrosive materials are passed through rotary machinery having wear rings, the plastic rings are not attacked as readily as are the exposed surfaces of the metallic parts thereof. Generally, there is a specific plastic material that will not be corroded by a particular caustic fluid that is to be introduced into the rotary machinery. Accordingly, it was highly desirable that the wear rings of rotary machines which work on, or are driven by, corrosive fluids, consist of an appropriately inactive plastic material.

The desirability of using plastic wear rings, therefore, presented a challenge to the industry to develop a means for minimizing the effects of high temperature and pressure on such rings so as to preclude or, at least, minimize the plastic deformation thereof.

Recognizing the advantages in being able to incorporate plastic wear rings in rotary machinery, the present inventor had developed a "pressure vented" wear ring and holder assembly, wherein the holder is formed with apertures for releasing high pressure fluid trapped between the wear ring and the holder. With the space between the holder and wear ring being vented to a low pressure region, the ring is actually forced, under suction, into a proper operational position. Accordingly, the present inventor had converted this troublesome pressure differential into a useful force, while minimizing or obviating the problems caused thereby.

This early innovation, developed by the present inventor, is disclosed in U.S. Pat. No. 2,851,289, which was issued Sept. 9, 1958.

Although the vented wear ring arrangement, disclosed in the aforementioned patent provided the industry with the solution for which it was searching, the present inventor recognized that it would be desirable if his vented wear ring arrangement could be modified to permit the use of plastic wear rings in an even more severe climate of pressure and temperature than that which is compatible with the existing assembly. The problem to be overcome in providing this capability is that, under severe temperature and pressure conditions, the plastic wear ring may tend to extrude through the high pressure release ports formed in the holding member.

OBJECTS AND SUMMARY OF THE INVENTION

It is therefore a general object of the present invention to provide an improved vented seal arrangement which may be utilized in rotary machinery at operational temperatures and pressures which are higher than those which are compatible with existing vented wear ring assemblies.

It is another object of the present invention to provide an improved vented wear ring assembly which permits effective venting of trapped high pressure fluids while utilizing fewer pressure release ports, formed in the holding member thereof, than heretofore possible.

It is still another object of the present invention to provide an improved vented wear ring assembly for use in rotary machinery which assembly is less expensive and more effective than existing such assemblies.

At least some of the above cited objects are achieved by the provision of a plurality of fluid passageways disposed intermediate a wear ring and a holder, adjacent high pressure fluid release vents formed in the holder, which plurality of passageways are operable to direct high pressure fluids radially, axially and circumferentially with respect to a cylindrical surface of the wear ring, to a high pressure fluid release vent. In one form of the invention, the passageways may be defined by a separate, discrete porous element.

BRIEF DESCRIPTION OF THE DRAWINGS

While the invention is particularly pointed out and distinctly claimed in a concluding portion of the specification a preferred embodiment is set forth in the following detailed description which may be best understood when read in connection with the accompanying drawings, in which:

DETAILED DESCRIPTION OF INVENTION

Figure 1:
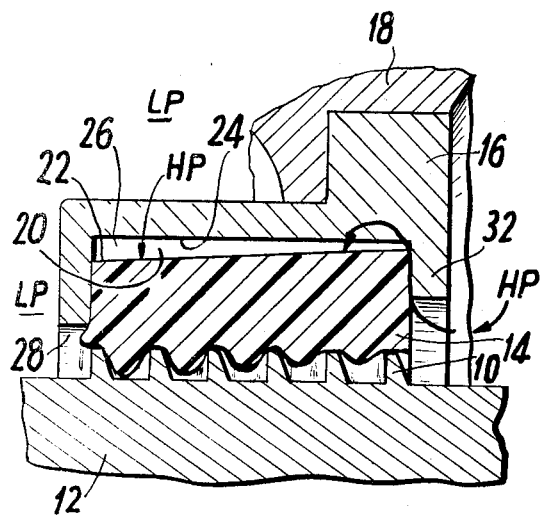
FIG. 1 is a partial, axial, sectional view of a typical prior art pressure wear ring assembly which existed before the inventor's earlier development of a "vented" seal assembly.

Referring now to the drawings, in which like numerals are used to indicate like parts, throughout the various views thereof, FIG. 1 presents a wear ring arrangement that is typical of the state of the art, as it existed before the inventor's earlier development of a "vented" wear ring assembly.

Serrations 10 radially project from rotary shaft 12 and may engage, in rubbing contact, with a plastic, wear ring seal 14. A wear ring seal holder member 16 may be mounted within the casing 18 of the overall rotary machine which may comprise a turbine, compressor, centrifugal pump, or the like. The holder member 16 may be formed to define an annular channel 20 for receiving the plastic ring 14.

It will be noted that the outer cylindrical surface 22 of the wear ring 14 and the inner cylindrical surface 24 of the holder member 16 cooperate to define an annular space 26. Although extensive efforts are made to eliminate this space, so that surfaces 22 and 24 are in flush contact, practically speaking, there will always be some space to permit high pressure fluid to penetrate the space 26, as indicated in FIG. 1 by the high pressure flow lines.

As can be seen from FIG. 1, the high pressure on the high pressure axial side of the ring seal assembly is operable to urge the plastic seal toward the low pressure side so as to deform the seal into grooves defined by the radial serrations of the rotor shaft 12. Simultaneously, the high pressure fluid trapped within the space 26 is operable to tilt the plastic wear ring downwardly at the low pressure side of the assembly, so that the combined force vectors operate to deform the plastic wear ring outwardly through the opening 28, at the low pressure side of the seal.

The mischief caused by the deformation of the wear ring into the grooves defined by the serrations 10 and through the opening 28 is compounded when the machinery is operating at temperatures which cause plastic deformation and extrusion of the plastic so as to effectively reduce the efficiency of the wear ring 14 as a pressure sealing element.

Figure 2:
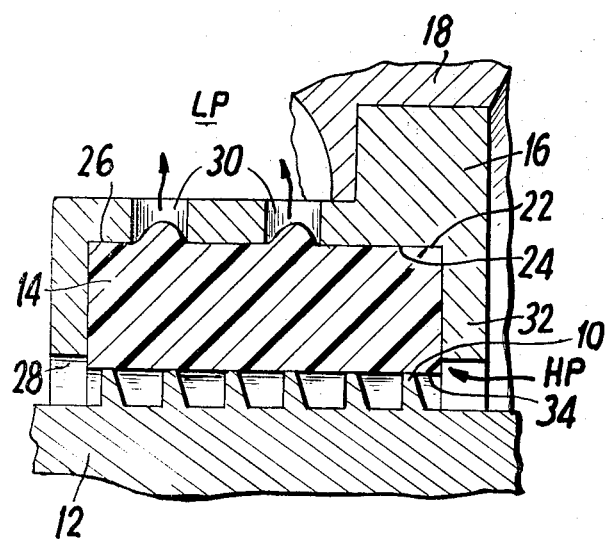
FIG. 2 is a partial, axial, sectional view of the aforementioned vented wear ring assembly which was earlier developed by the inventor and is the subject matter of U.S. Pat. No. 2,851,289.

This then was the situation confronting the industry when the present inventor developed his "pressure vented" wear ring assembly. FIG. 2 sets forth a partial, axial, sectional view of a typical "vented" seal assembly which is the subject matter of the inventor's U.S. Pat. No. 2,851,289.

Referring now to FIG. 2, it can be seen that high pressure fluid release vents, or ports, 30 are formed to extend entirely through the holder member 16 so as to communicate the space 26 with the low pressure region. Accordingly, any high pressure fluid which may penetrate into the space 26 is immediately exhausted through the ports, or vents, 30.

Additionally, the communication of the low pressure region with the surface 22 of the plastic wear ring is operable to pull, under suction, the surface 22 into pressure engagement with the surface 24 of the holder member 16. Accordingly, the inventor had eliminated the problem caused by the pressure differential, across the overall seal, and utilized this pressure differential to maintain the plastic wear ring in a proper operational posture. The inventor also lengthened the high pressure leg 32 of the wear ring holder 16 so as to reduce the radially extending area of wear ring upon which the high pressure of the high pressure region acted. This reduces the tendency for the wear ring 14 to be extruded through the opening 28.

The inventor's earlier developed "vented" wear ring assembly, as set forth in FIG. 2, has served well in turbines, compressors, centrifugal pumps, and the like, under higher pressure and temperature conditions than could be practically handled by plastic wear rings, prior to that earlier innovation. Nevertheless, it is desirable to still improve that innovation so that plastic wear rings can be utilized under even more severe conditions of temperature and pressure. The problem to be solved was that, under extreme pressure and temperature conditions, a plastic wear ring tends to extrude radially outwardly through the high pressure fluid release vents 30. Although this extrusion is not nearly so unacceptable as the extrusion experienced in the prior art devices, as set forth in FIG. 1, extrusion through the vent holes 30 would tend to affect the tolerance between the inner cylindrical surface 34 of the wear ring and the radial serrations 10.

Furthermore, the drilling of high pressure fluid release vents 30 presents an additional expense in the fabrication of the assembly. Accordingly, it would be desirable to be able to utilize a holder having fewer vents than are necessary in the inventor's earlier "vented" seal assembly, shown in FIG. 2.

Figure 3:
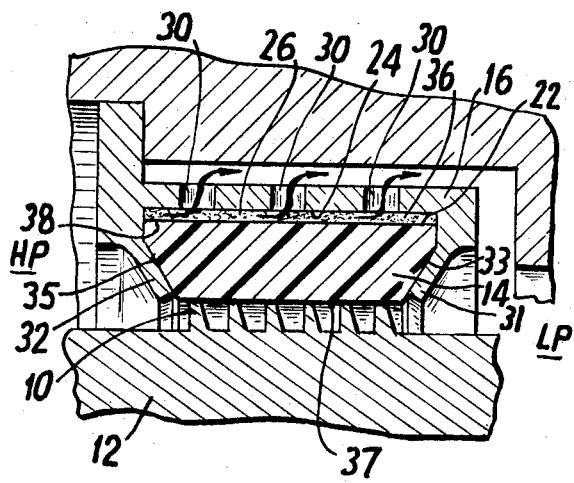
FIG. 3 is a partial, axial, sectional view of an improved vented wear ring assembly, according to the present invention.

FIG. 3 is a partial, axial, sectional view of one embodiment of the present invention. As can be seen, an intermediate ring, or liner, 36 is disposed between the surfaces 22 and 24 of the wear ring and the wear ring holder, respectively.

The intermediate ring 36 may comprise a porous material having a multiplicity of interstices which act as passageways for directing high pressure fluid radially, axially and circumferentially of the wear ring 14, so as to communicate the space 26 with the low pressure region through the vents 30. The porous ring 36 may comprise a fiber metal such as the material sold under the trademark FELT METAL by the Huyck Metals Company of 45 Woodmont Road, Milford, Connecticut. In the alternative, fine wire mesh or a sintered ceramic material may also be effectively utilized.

Since the inner cylindrical surface 38 of the ring 36 may be formed to fit flush against the outer cylindrical surface 22 of the plastic wear ring 14, the wear ring 14 is supported in the radial direction against outward deformation, while any high pressure fluid penetrating space 26 (now occupied by the porous ring 36) is directed axially and circumferentially of the wear ring 14 to an adjacent high pressure release vent 30. Therefore, since the plastic of the wear ring 14 will not be extruded, to any substantial degree, into the interstices of the porous ring 36, the problem of radial deformation and of the extrusion of the plastic wear ring 14 (under extreme temperature and pressure conditions) is effectively minimized or even obviated. Accordingly, the holder member 16 and the porous ring 36 cooperate, in a synergistic manner, to maintain the wear ring 14 in a proper operational posture.

Additionally, the low pressure and high pressure legs 31 and 32, respectfully, of the holder 16 may be mutually inclined and the cross-sectional configuration of the plastic ring 14 may be formed with correspondingly inclined surfaces 33 and 35. This arrangement locks the wear ring 14, in place; prevents the ring from urging into the serrations, upon contraction of the ring; and reduces the effective horizontal area 37 exposed to a pressure difference across the seal assembly.

Furthermore, since the porous ring 36 is effective to direct high pressure fluid axially and circumferentially within the space 26, only a very few vent holes need be formed in the holder member 16. Therefore, a substantial saving may be realized in the fabrication of that member.

Figure 4:
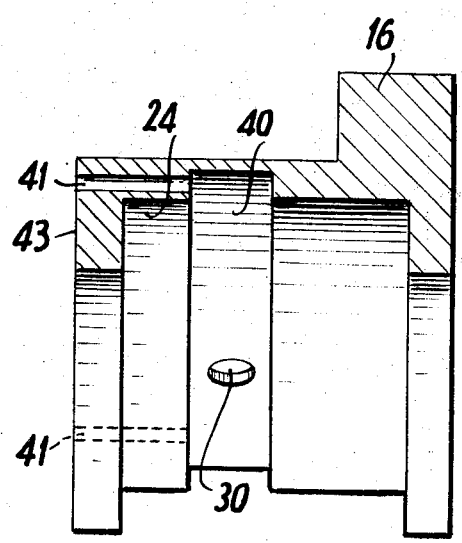
FIG. 4 is a partial, axial, sectional view of a modification in a holding member of the assembly shown in FIG. 3.

Referring now to FIG. 4, a modification of the embodiment set forth in FIG. 3, is shown in partial, axial, sectional view. More specifically, the holder member 16 may be formed with an annular groove 40, formed in the surface 24 thereof, and an axial passageway 41 extending from the groove 40 to radial face 43, adjacent the low pressure area. The member 16 may be of a "split" construction as may the wear ring 14 and the porous ring 36. Of course, when the members 14, 16 and 36 are assembled, generally continuous rings should be formed. In operation, high pressure fluid may be directed axially through the porous ring 36 toward the annular groove 40, of the holder 16. The portion of the holder member 16, defining the circumferentially extending surface of the groove 40, may be formed with a very few number of radial vents 30, or axial vents 41, or both. Accordingly, the space defined within the groove 40 will be at a low pressure so as to immediately release any high pressure fluid penetrating into the porous member 36.

It can thus be seen that an improved, pressure vented, plastic, wear ring assembly has been herein provided which may be utilized in more severe temperature and pressure environments than heretofore possible. Another significant advantage, provided by the present invention, is that fewer high pressure fluid vents need be formed in the holding member, for effectively releasing high pressure fluid, penetrating into the space 26.

The provision of axial, radial and circumferential fluid passageways in the space 26, by way of an intermediate porous ring member, permits the venting of trapped high pressure fluid, while supporting the plastic wear ring against radially outward deformation through the vent holes in the holding member. Accordingly, the maximum differential pressure that can be handled by the overall seal arrangement is substantially increased, as is the permissible operational temperature.

SCOPE OF THE INVENTION

Although the foregoing embodiments have been described in terms of pressure "seal" assemblies, it is to be understood that the venting arrangement of the present invention may also be utilized in connection with rotary shaft "bearing" assemblies, supporting shafts operating with fluids.

Furthermore, while what has been described herein is a preferred embodiment of the present invention it is, of course, to be understood that various modification and changes may be made therein without departing from the invention. Accordingly, it is intended to cover in the following claims all such modifications and changes as may fall within the true spirit and scope of the present invention.

What I claim is:

1. In rotary machinery, including a wear ring element mounted in a holding member to extend generally co-axially about a rotatable shaft, a low pressure fluid region and a high pressure fluid region being disposed on opposite axial sides of the wear ring, and the holding member being formed with a port for exhausting high pressure fluids trapped between the wear ring element and the holding member, the improvement comprising:

means disposed intermediate said wear ring and said holding member for directing the trapped high pressure fluid axially, radially and circumferentially of the wear ring to the exhaust port of the holding member; said means being further operable to maintain the wear ring element in a properly aligned operational posture.

2. The improvement according to claim 1, wherein said last mentioned means comprises an annular member consisting of a porous material having sufficient compressive strength to maintain the holding member and wear ring element in a predetermined spaced relationship with respect to the shaft, while maintaining axially, radially and circumferentially extending fluid passageways for directing the trapped high pressure fluid to the exhaust port of the holding member.

3. The improvement according to claim 2, wherein said porous material consists of fiber metal.

4. The improvement according to claim 2, wherein said porous material consists of a wire mesh.

5. The improvement according to claim 2, wherein said porous material consists of a sintered ceramic material.

6. A pressure vented fluid seal assembly for rotary machinery comprising, in combination:

labyrinth serrations formed on a rotor member of the machinery to extend generally in radial planes, a wear ring disposed co-axially about and in rubbing contact with the outer peripheries of said serrations, a high pressure fluid region being developed on one axial side of said wear ring and a low pressure fluid region being disposed on an opposite axial side of said wear ring, a holding member for maintaining said wear ring in an operational posture, an exhaust port being formed in said holding member for exhausting high pressure fluid trapped between said wear ring and said holding member to the low pressure fluid region, and an annular porous member disposed between said holding member and said wear ring for radially spacing said wear ring from said holding member and for carrying the trapped high pressure fluid from between said holding member and said wear ring radially, axially and circumferentially of the wear ring to said exhaust port of said holding member.

7. The combination according to claim 6, wherein said holding member is formed with a circumferentially extending groove disposed about an internal surface thereof for communicating said exhaust port with high pressure fluid passing through said annular porous member.

8. The combination according to claim 6, wherein said holding member is formed to define an annular space for snugly receiving said annular porous member and said wear ring, said holding member having generally radially extending, mutually inclined walls at least partially defining said annular space.

9. The combination according to claim 7, wherein said exhaust port comprises a generally axially extending passageway formed in said holding member.

10. The combination according to claim 6, wherein said annular porous member consists of fiber metal.

11. The combination according to claim 6, wherein said annular porous member consists of a sintered ceramic material.

12. The combination according to claim 6, wherein said annular porous member consists of a wire mesh.

13. For use in a fluid seal assembly surrounding the rotor of a rotary machine and including a wear ring and a wear ring holder formed with an exhaust port:

an annular porous member sized to fit snugly between opposing faces of the wear ring and the wear ring holder, and said annular porous member being formed with interstices operable to carry fluid radially, circumferentially and along substantially the entire axial length of said annular porous member.

14. The apparatus set forth in claim 13, wherein said annular porous member consists of fiber metal.

15. The apparatus set forth in claim 13, wherein said annular porous member consists of a sintered ceramic material.

16. The apparatus set forth in claim 13, wherein said annular porous member consists of a wire mesh.

* * * * *